US007525576B2

United States Patent
Kannermark et al.

(10) Patent No.: US 7,525,576 B2
(45) Date of Patent: Apr. 28, 2009

(54) METHOD AND APPARATUS FOR PANNING AND TILTING A CAMERA

(75) Inventors: Per Kannermark, Malmo (SE); Stefan Lundberg, Lund (SE)

(73) Assignee: Axis, AB, Lund (SE)

( * ) Notice: Subject to any disclaimer, the term of this patent is extended or adjusted under 35 U.S.C. 154(b) by 669 days.

(21) Appl. No.: 10/778,796

(22) Filed: Feb. 13, 2004

(65) Prior Publication Data

US 2004/0196378 A1 Oct. 7, 2004

Related U.S. Application Data

(60) Provisional application No. 60/462,275, filed on Apr. 10, 2003.

(30) Foreign Application Priority Data

Feb. 17, 2003 (SE) .................................. 0300428

(51) Int. Cl.
 *H04N 5/228* (2006.01)
 *H04N 7/00* (2006.01)
(52) U.S. Cl. ..................................... 348/222.1; 348/36
(58) Field of Classification Search ................ 348/262, 348/36, 38, 42, 47, 211.11–211.12, 143–159
See application file for complete search history.

(56) References Cited

U.S. PATENT DOCUMENTS

| | | | |
|---|---|---|---|
| 5,187,571 A * | 2/1993 | Braun et al. .................. 348/39 |
| 5,282,268 A | 1/1994 | Mieras et al. | |
| 5,396,284 A * | 3/1995 | Freeman ..................... 348/154 |
| 5,657,073 A | 8/1997 | Henley | |
| 6,020,931 A * | 2/2000 | Bilbrey et al. ............... 348/584 |
| 6,141,034 A | 10/2000 | McCutchen | |
| 6,317,166 B1 | 11/2001 | McCutchen | |
| 6,654,045 B2 * | 11/2003 | Allen et al. ............... 348/14.08 |

(Continued)

FOREIGN PATENT DOCUMENTS

EP 0328356 8/1989

(Continued)

*Primary Examiner*—David L Ometz
*Assistant Examiner*—Pritham Prabhakher
(74) *Attorney, Agent, or Firm*—Volpe and Koenig, P.C.

(57) ABSTRACT

A camera is disclosed which includes: at least two image sensors, an image sensor selector, a multiplexer and an image processor. The at least two image sensors are configured to synchronously output successive pixels of image data. The image sensor selector is responsive to a pan and/or tilt signal input associated with a target view of the image data provided by the at least two image sensors, to output a select signal indicating for each synchronous output of pixels from the at least two image sensors a selected one of the at least two image sensors delivering a pixel within the target view. The multiplexer has inputs, an output, and a control input. The multiplexer inputs are each coupled to a corresponding one of the at least two image sensors to receive the successive pixels of image data there from. The multiplexer is responsive to the select signal from the image sensor selector at the control input to output the selected one of the pixels at the input which is within the target view during each pixel clock cycle. The image processor has an input coupled to the output of the multiplexer for processing the pixels within the target view.

14 Claims, 5 Drawing Sheets

U.S. PATENT DOCUMENTS

| | | | |
|---|---|---|---|
| 6,704,460 B1 * | 3/2004 | Pitruzzello et al. | 382/284 |
| 6,928,194 B2 * | 8/2005 | Mai et al. | 382/284 |
| 7,023,913 B1 * | 4/2006 | Monroe | 375/240.01 |
| 7,136,415 B2 * | 11/2006 | Yun et al. | 375/240.26 |
| 2003/0085998 A1 * | 5/2003 | Ramirez-Diaz et al. | 348/143 |

FOREIGN PATENT DOCUMENTS

| | | |
|---|---|---|
| WO | WO 9847291 | 10/1998 |
| WO | WO 0148537 | 7/2001 |
| WO | WO 0201876 | 1/2002 |
| WO | WO 02/13515 | 2/2002 |
| WO | WO 0230122 | 4/2002 |
| WO | WO 03056812 | 7/2003 |

* cited by examiner

METHOD AND APPARATUS FOR PANNING AND TILTING A CAMERA

CROSS REFERENCE TO RELATED APPLICATION

This application claims the benefit of prior filed co-pending Provisional Applications No. 60/462,275 filed on Apr. 10, 2003 entitled "Digital Camera having Panning and/or Tilting Functionality" and Swedish Patent Application No. 0300428-0, filed Feb. 17, 2003 entitled "Digital Camera having Panning and/or Tilting Functionality" which are incorporated herein by reference in their entirety as if fully set forth herein.

BACKGROUND OF THE INVENTION

1. Field of the Invention

The present invention relates to a camera having panning and/or tilting functionality and a method for such a camera.

2. Description of the Related Art

Cameras are widely used in order to make it possible to see or study remote sites. For example, cameras are used in surveillance systems and for presenting specific objects or surroundings to persons having access to such a camera via a network. For the reason of extending the area that may be viewed via a camera, or for other reasons, different types of pan/tilt solutions has been used in the past.

The most common solutions has been to provide the camera with a motor driven mechanism for turning the camera in the horizontal direction, i.e. panning, in the vertical direction, i.e. tilting, or in both the horizontal and vertical direction, i.e. panning and tilting, in order to scan a greater area than is possible with a stationary camera. Other implementations of the pan and/or tilt functionality have also been presented. One such implementation is to turn only the objective of the camera and another is to position a turning mirror in front of the camera.

All these solutions involves mechanical turning of devices of the camera or in the near proximity of the camera in order to achieve pan and/or tilt functionality. As commonly known, such turning of devices inevitably results in mechanical deterioration of at least the components involved in the turning. Thus, the cameras equipped with the above mentioned implementations of pan tilt functionality have to be serviced frequently, which results in extra work and, if the cameras are not maintained regularly, in the loss of pan tilt functionality until the camera is properly maintained. Further, cameras having pan tilt functionality implemented according to the above mentioned tends to be much more expensive than a camera having a fixed view. Accordingly, the present arrangements for providing a camera with pan and/or tilt functionality are unsatisfactory.

SUMMARY OF THE INVENTION

It is an object of the present invention to provide a camera having improved pan and/or tilt functionality.

In an embodiment of the invention a camera includes: at least two image sensors, an image sensor selector, a multiplexer and an image processor. The at least two image sensors are configured to synchronously output successive pixels of image data. The image sensor selector is responsive to a pan and/or tilt signal input associated with a target view of the image data provided by the at least two image sensors, to output a select signal indicating for each synchronous output of pixels from the at least two image sensors a selected one of the at least two image sensors delivering a pixel within the target view. The multiplexer has inputs, an output, and a control input. The multiplexer inputs are each coupled to a corresponding one of the at least two image sensors to receive the successive pixels of image data there from. The multiplexer is responsive to the select signal from the image sensor selector at the control input to output the selected one of the pixels at the input which is within the target view during each pixel clock cycle. The image processor has an input coupled to the output of the multiplexer for processing the pixels within the target view.

In another embodiment of the invention a camera to capture sequential images from a monitored area is disclosed. The camera includes: at least two image sensors, an image sensor selector, a multiplexer and an image processor. The at least two image sensors are each configured to deliver a rasterized pixel stream obtained from a corresponding portion of the monitored area. The image sensor selector is responsive to an input signal corresponding with at least one of a pan instruction and a tilt instruction to effect a corresponding logical movement of a target view within the monitored area, and to output a select signal corresponding with a location of the target view. The multiplexer is coupled to the at least two image sensors and the image sensor selector. The multiplexer is responsive to the select signal from the image sensor selector to multiplex from each of the rasterized pixel streams of the at least two image sensors those pixels required to form sequential images of the target view, thereby avoiding the multiplexing of pixels not required for the target view. The image processor processes the multiplexed pixels from the multiplexer into the target view.

In still another embodiment of the invention a method for capturing sequential images from a monitored area is disclosed. The method comprises the acts of:

delivering at least two rasterized pixel stream each obtained from a corresponding portion of the monitored area;

generating a select signal corresponding with a location of the target view within the monitored area responsive to an input signal corresponding with at least one of a pan instruction and a tilt instruction;

multiplexing in response to the select signal generated in the generating act, from each of the rasterized pixel streams delivered in the delivering act, those pixels required to form sequential images of the target view, thereby avoiding the multiplexing of pixels not required for the target view; and processing the multiplexed pixels from the multiplexing act into sequential images comprising the target view.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF THE EMBODIMENTS

Figure 1:
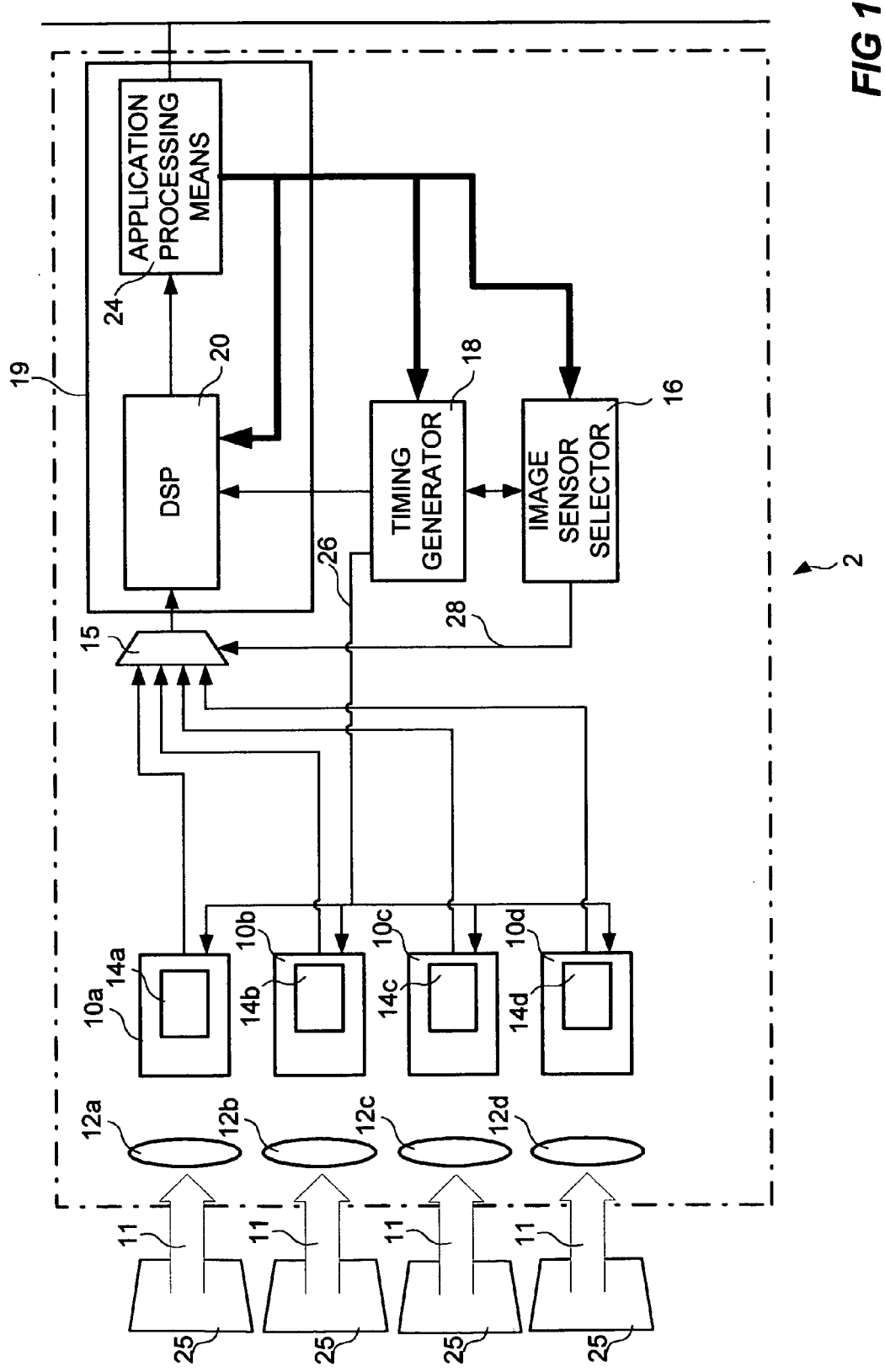
FIG. 1 is a schematic block diagram of one embodiment of a camera according to the invention.

The camera according to the invention includes at least two image sensors making it possible to register at least twice as much image information as with a camera having only a single image sensor. Thus, in relation to a camera having a single image sensor the camera according to the invention may register image information of a much larger area without reducing the sharpness or wealth of details of the image that may be represented by the registered image information. Also, the camera according to the invention may register image information of an area having the same size as an area registered by means of a camera having a single image sensor, but then the image information registered by means of the camera according to the invention represents much greater sharpness or wealth of details.

Additionally, by arranging a multiplexer that selectively may forward a pixel from any one of the image sensors at every pixel clock cycle, it may be possible to select specific portions of the image data from one image sensor and specific portions of the image data from another image sensor in real time. Accordingly, if the size, i.e. number of pixels, of the image that are to be processed and provided to a user is less than the total size of an image represented by the at least two image sensors together, the position, within the image represented by the at least two image sensors in combination, i.e. a view of a monitored area, of the image that is provided to the user may be dynamically altered by means of making the image selector changing the control signal controlling the multiplexer. Thus, the multiplexer, which is controlled by the image sensor selector, makes it possible to select the image data to be forwarded to the image processing means based on at least one value indicating the present pan and/or tilt and, thus, a virtual pan and/or tilt functionality may be obtained.

The decimation of the pixels from a plurality of image sensors to one resulting pixel stream being a subset of the total number of pixels sent from the plurality of image sensors and wherein the resulting view represents a portion of a monitored area may be provided in real time, i.e. no buffers may be necessary. Accordingly, the camera according to the invention may provide pan and/or tilt functionality without the use of moving parts for implementing this functionality. Thereby, extending the durability of such camera, especially if the pan and/or tilt functionality of the camera is frequently used.

Further, because the image processor may be provided with a subset of the image data of one image sensor and a subset of the image data of another image sensor, the camera may generate an image from the image data captured by the at least two image sensors without making the image processing means process all image data captured by the at least two image sensors. Additionally, the implementation according to the invention may be more cost effective than the prior art implementations.

According to one embodiment the camera includes a timing generator that is connected to the at least two image sensors of the camera. Additionally, the timing generator and the connections to the at least two image sensors are arranged to provide the at least two image sensors with synchronized timing signals. By synchronizing the timing signals provided to the at least two image sensors the switching between image data from different image sensors may be implemented in a simple manner. According to one embodiment the multiplexer only has to switch between the signals from different image sensors and directly forward the signal to the image processing means without any buffering. According to another embodiment both pixel clock signals and reset signals provided to the at least two image sensors are synchronized. This means that the pixels of the rasterized pixel stream that is sent simultaneously from the at least two image sensors to the multiplexer represent corresponding pixels, in regard of position within each image sensor. Thus, the at least two image sensors start outputting a first pixel of an image frame essentially simultaneously and starts outputting every pixel following the first essentially simultaneously. By means of this embodiment, it may be possible to define a resulting pan and/or tilt image of essentially the same size as a view from one of the image sensors. The resulting pan and/or tilt image may include image data from more than one of the at least two image sensors and all image data representing the resulting pan and/or tilt image may be forwarded to the image processing means during one transfer cycle of an image frame of one of the at least two image sensors without requiring more capacity from the DSP than a camera having one single image sensor. Thus, in respect of time and in respect of the amount of image data that has to be processed by the image processing means, the arrangement according to the invention do not have to be provided with more memory for storing and processing the at least double amount of image data originating from at least two image sensors and the processing frequency does not have to be increased in order to provide the same frame rate as in a camera having one image sensor. Accordingly, it may be very easy to implement the invention in existing technology.

According to another embodiment the camera further comprises a light focusing system arranged to focus reflected light from at least a first view and a second view to said at least two image sensors. The at least first view and second view are adjacent to each other and wherein two adjacent views are overlapping each other. The light from the at least two different views are focused onto the at least two image sensors for registration of an image at each image sensor. By making the at least two adjacent views overlap each other the pixels originating from one image sensor may easily be separated from pixels originating from another image sensor and then reordered and combined with pixels from another image sensor by stitching, i.e. recognizing common features within the image data from different image sensors and rearranging the image data into a single non distorted image, because the image from one image sensor includes a portion of the image of the other image sensor.

All the above mentioned are of course also applicable to cameras comprising a greater number of image sensors receiving light from adjacent views. For example, four image sensors may be arranged horizontally after each other, making it possible to get a great pan range, four image sensors may be arranged vertically, making it possible to get a great tilt range, or four image sensors may be arranged in a square, i.e. two horizontally arranged image sensors positioned vertically adjacent to two other horizontally arranged image sensors, making it possible to both pan and tilt. In alternate embodiments there may be any number of image sensors.

Another advantage that the camera according to the invention may possess is that multiple users may request images from the same camera but with different pan and/or tilt settings without any conflict between the requests. This may be achieved by, for example, providing each user with images from different output cycles of the image sensors and individually adapting the value controlling the image sensor selector for each image output cycle in accordance with the request of the user that is to receive that image. Such access to a camera having pan and/or tilt functionality is not practically possible to implement for a camera provided with a prior art mechanical pan and/or tilt arrangement.

In FIG. 1, a schematic block diagram of one embodiment of a camera 2 according to the invention is showed. The camera 2 comprises four image sensors 10a-d, each arranged to detect light 11 that is received via a lens system 12a-d and deliver pixels representing the detected light, analogue processing means 14a-d, a multiplexer 15, an image sensor selector 16, a timing generator 18, and an image processor 19 including a Digital Signal Processor 20 (DSP) and application processing means 24. The camera may include additional features and functions without departing from the scope of the invention. The camera may be any kind of camera, e.g. a surveillance camera, a web camera, a network enabled camera, a handheld camera, a digital camera, a digital camera with analog image inputs or outputs, a video camera, etc.

The camera 2 captures an image by detecting the reflected or transmitted light 11 from objects within a view 25, wherein a view 25 is a part of the environment or a monitored area that is "seen" by the lens system 12a-d and the image sensors 10a-d. Thus, the light 11 is captured by lens systems 12a-d and directed onto the image sensors 10a-d, which either may be or include Charge Coupled Devices (CCD), CMOS-type image sensors or other types of sensors. Each image sensor may output rasterized pixel streams representing captured sequential image frames.

The monitored area may be a "three dimensional" environment such as a warehouse, a corridor, parking area, a room, etc. or it may be a "two dimensional" environment such as a wall, a desktop, an entrance door, etc.

Each image sensor 10a-d is controlled by means of timing signals 26 that is provided by the timing generator 18. The timing signals 26 required by an image sensor 10a-d may vary depending on the manufacturer and/or the type of the image sensor. However, the image sensors 10a-d, according to one embodiment of the invention, require at least one or a plurality of input signals for timing an output of detected pixels, hereinafter called pixel clock signal, and a reset signal for resetting the sensors. The pixel clock signal may, for example, include a signal providing an horizontal transfer clock and a signal providing a vertical transfer clock, thus, making it possible to control or learn the position of the pixel that is to be or is outputted at any given time. The timing generator 18 that generates these timing signals 26 may be a timing generator specially designed for providing a specific image sensor with timing signals 26 or a more general timing generator that may be adapted to the image sensor that are used in the digital camera. Timing generators like these are well known to a person skilled in the art. Said pixel clock signal and reset signal may be synchronised for all image sensors 10a-d, e.g. by utilising a common pixel clock signal and a common reset signal for all image sensors. Details regarding one purpose of providing the image sensors with synchronised pixel clock signals and reset signals in said embodiment will be described below.

The output from an image sensor 10a-d is, according to one embodiment, a digital pixels stream which is forwarded to the multiplexer 15. According to this embodiment each image sensor 10a-d includes an light sensitive array, which generate a pixel stream wherein each pixel value is represented by an analogue value, connected to an analogue processing means 14a-d. The analogue processing means 14a-d may include an analogue image processing means and an Analogue to Digital converter (A/D converter). The analogue processing means 14a-d performs initial image processing and may be of a type that is commonly utilized in digital camera systems of today and that is well known to a person skilled in the art. Some examples of image processing that may be performed in the analogue processing means are CDS (Correlated Double Sampling), black level correction, change of gamma, etc. After the image processing the analogue signal is converted to a digital signal by means of an A/D-converter before it is forwarded to the multiplexer 15. By converting the image data to a digital signal before the signal reaches the multiplexer 15 it is possible to utilize digital multiplexing, which is more accurate and easier to implement than analogue multiplexing.

However, according to another embodiment, not shown, the image sensors 10a-d do not include said analogue processing means 14a-d and therefore a single analogue processing means may be arranged between the multiplexer 15 and the DSP 20. Thus, the output from the multiplexer 15 is provided to the DSP 20 via the analogue processing means. Accordingly, the multiplexer 15 should be able to perform analogue multiplexing. Using this implementation one analogue processing means only has to be implemented.

According to one embodiment, the multiplexer 15 includes four inputs, each being connected to an image sensor 10a-d, and one output. The multiplexer, regardless of whether it performs analogue or digital multiplexing, receives image information from all four image sensors at said inputs pixel by pixel. The multiplexer 15 may also be called pixel selector 15. In other words, the image data, which is transferred from the image sensor pixel by pixel, from one of the image sensors is received pixel by pixel at the input of the multiplexer corresponding to the image sensor. Further, it receives a select signal 28 from an image sensor selector 16. The select signal control which image signal to pass on to the DSP 20, i.e. when the multiplexer 15 receives a select signal having a specific value, the image signal at an input of the multiplexer corresponding to said specific value is passed on to the output of the multiplexer 15 until the value of the select signal is changed to another value that may indicate another input. Accordingly, the multiplexer 15 may be used to vary the origin of the image data provided to the DSP 20. Thereby, the resulting image signal, representing one image frame of a sequence of image frames or one single image, may, after the multiplexer 15, include image information originating from a plurality of views 25, i.e. from a plurality of image sensors. For example, the resulting image signal representing one image frame may include some image information originating from the image sensor 10a, some originating from the image sensor 10b, etc.

The image sensor selector 16 is generating and providing the multiplexer 15 with said select signal 28. Thereby, the image sensor selector 16 controls what pixels that are sent to the DSP, in regard of the image sensor 10*a-d* from which the pixels originate. In order to generate a control signal that make the multiplexer 15 forward a desired pixel, from the different image sensors, the image sensor selector 16 may base the generation of the control signal on a function which depends on a signal/value from a predetermined selection scheme programmed into the camera or on an external control signal/value provided to the camera system. The external control signal/value may be sent from an input means that makes it possible to indicate directions or positions. The signal/value may then be used in said function of the image sensor selector 16 to control which portions from said image sensors 10*a-d* to forward to the DSP 20 and, thus, which portions of the monitored view that are included in the resulting view.

Said input means may be a computer, a Personal Digital Assistant (PDA), a mobile telephone or an ordinary telephone, all having an application for controlling the pan/tilt of the camera. Also, the input means may be an input means that is connected to any of the above mentioned input means or another system in order to, more or less, directly providing said directional information to the camera, such input means may be a joystick, a trackball, a mouse, arrow keys, etc.

In order to readily control the composition of the rasterized pixel stream received at the DSP 20, the image sensor selector 16 is provided with pixel clock signals from the timing generator 18, indicating the progress of the present output of pixels from the image sensors 10*a-d*. Thus, the pixel clock signal may for instance be signals similar to the signals sent to the image sensors 10*a-d*.

The image sensor selector may be implemented by means of program code generating relevant signals and setting relevant registers in the hardware.

One way of generating a select signal that enable pan/tilt functionality according to one embodiment will be presented below.

The DSP 20 receives the selected pixels in a pixel stream and timing signals in order to process the image data. This is performed in a manner known by a person skilled in the art. In alternate embodiments of the invention the DSP may be replaced or complemented with an processor or logic embodied in hardware, software, or firmware which accomplished the above referenced functions. These include but are not limited to: a PLD, a PGA, a processor, a combination of registers and buffers, a pixel data path or a pixel pipeline.

The application processing means 24 includes applications and functions of the camera. For example, it may include an interface application for setting parameters of the digital camera, functions for formatting the image data into specific formats, applications for altering the image, and/or protocols for communication via networks or other physical interfaces. Also, the application processing means may be arranged to provide data and/or control signals to the image sensor selector 16, the timing generator 18 and the DSP 20.

The application processing means 24 receives the digitally processed image information from the DSP 20 and perform a final processing of the image. This final processing of an image may be formatting the image into a known image format, e.g. .JPG, .TIFF, .BMP, etc., a known video streaming format, e.g. AVI, MPEG_1-4, or other known image formats designed for transmission or storing of still images or video images. The final processing of an image may also include rearranging pixels originating from different image sensors, but belonging to in a pixel stream of representing image frame into one continuous image, e.g. by separating pixels of a specific view from the pixels of other views and stitching the separate parts together in a correct order; providing the image with a graphic overlay such as time stamps, company logos etc.; and other types of processing known to a person skilled in the art. The rearranging of pixels of a pixel stream of an image may, according to one embodiment, include the acts of buffering the pixels of the pixel stream is associated with one image frame, reorder the pixels based on location parameters that identifies a user view also know as a target view within the view covered by all the image sensors and that where valid when the pixels where selected, and deleting portions of the resulting image containing redundant image information, e.g. pixels representing the same portion may be present because of overlapping views from the separate image sensors. After rearranging the pixels the intensity of adjacent pixels, e.g. adjacent pixels from different image sensors, may be adapted, e.g. by filtration, in order to make the transition between areas originating from one image sensor and areas originating from another image sensor less visible.

Further, the rearranging of pixels of a pixel stream of an image frame may also be performed in a client computer receiving the image for displaying or storing. When the final processing of the image is performed the application processing means may send the image or sequence of images via a computer network to one or a plurality of receivers. A receiver may be a display, a computer, a PDA, a mobile telephone, an ordinary telephone, a surveillance center, a video server, a digital video recorder, an analogue video recorder, etc. all arranged for viewing and/or recording the images from the camera.

In order to facilitate the understanding of the invention, one way of controlling the camera according to the above mentioned embodiment now will be described with reference to FIG. 1 and FIG. 2. In order to simplify the description each of the four image sensors 10*a-d* capturing an image of 8×6 pixels are described. The methods and apparatus described in detail below in this context are fully scalable to cover image sensors delivering mega-pixel images without departing from the scope of the invention.

In the embodiment of the digital camera used in this example the image sensors 10*a-d* are provided with synchronized timing signals 26, relating to reset of the image sensors and to the transfer of pixels, i.e. the image sensor reset signals and the pixel clock signals to all four image sensors are identical or the same. This means that the pixel transfers from the image sensors 10*a-d* are synchronized, i.e. the pixels representing the same position within each image sensor 10*a-d* are transferred simultaneously. Further, the pixels, according to this example, are transferred from each image sensor 10*a-d* pixel by pixel and line by line.

Figure 2:
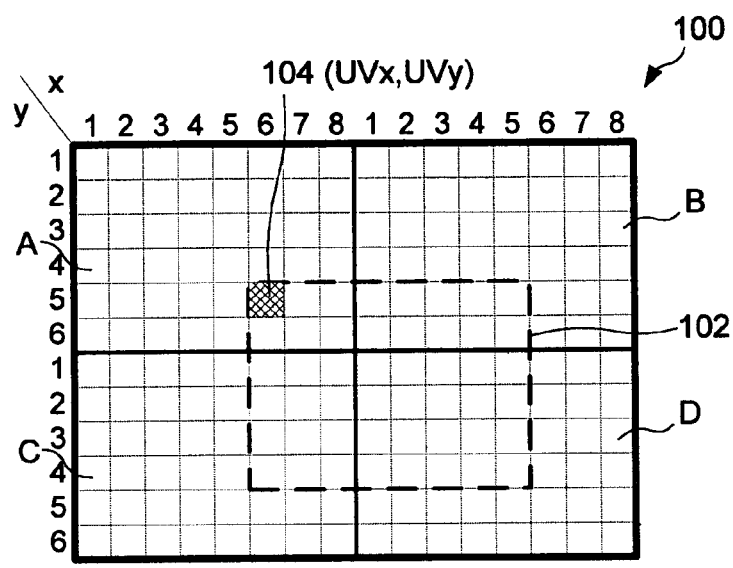
FIG. 2 is a schematic view of one possible way to arrange the views of the camera in FIG. 1, FIG. 3 are schematic diagrams of the transfer of pixels from the image sensors to the multiplexer of the camera in FIG. 1.

In FIG. 2 the four discrete portions of the monitored area or environment covered by respective ones of the four image sensors 10*a-d* are shown. As depicted in the figure, each image sensor 10*a-d* captures a fourth of a total view 100, i.e. a quadrant of the monitored area or environment covered by means of all image sensors 10*a-d* together. Image sensor 10*a-d* provide coverage of the upper left, upper right, lower left, and lower right portions of the monitored area, respectively. In this example the lenses 12*a-d* and image sensors 10*a-d* are assumed to be arranged to register adjacent images without any overlap and missed portions, i.e. the lenses 12*a-d* and image sensors 10*a-d* is arranged with such perfection that it would be possible to generate a distortion free image by simply positioning the images from each image sensor adjacent to each other in the form of a square corresponding to the form of the total view 100. In reality it is difficult, maybe even impossible, to arrange the lenses 12*a-d* and image sensors 10*a-d* with such perfection, and thus in such an implementation it may be necessary to arrange the lenses 12a-d and the image sensors 10a-d so that image sensors capturing adjacent views register some common image information. By doing that the image information from different image sensors may be stitched together.

Image information in the total view 100 that is to be processed by the DSP 20 and that the image provided to at least one device for viewing is to be based on is indicated by a dashed line in the figure and is called user or target view 102. In this example the user a.k.a. target view 102 consists of the same amount of pixels and the same aspect ratio as provided by any one of the image sensors 10a-d. In this embodiment of the invention, the position of the user view 102 is determined by the position of the top left pixel 104 of the user view. In this embodiment of the invention, the coordinates of the top left pixel are expressed in a translatable two-dimensional frame of reference. In this coordinate system the top left pixel of the user/target view 102 is given coordinates expressed as positive x and positive y offsets from the top left corner of the corresponding image sensor view. This allows the user/target view to be expressed in coordinates common to any of the views provided by the individual image sensors. In the particular example shown the top left pixel of the target/user view has coordinates: $UV_x=6$, $UV_y=5$.

The user view 102 may initially be centered in the total view 100 and when the user want to pan or tilt the view this may be performed by indicating a direction in which the user view 102 is to be panned or tilted. In such case, the indication of a direction is received at the camera 2 and provided to the image sensor selector 16, which calculates a new position of the top left pixel 104 of the user view 102 based on the indication of direction, e.g. the values of UVx and UVy are increased or decreased in accordance with the desired pan/tilt motion. The panning and/or tilting may also be controlled by providing positions instead of directions, e.g. a new position $UV_x$, $UV_y$ of the top left pixel 104 of the user view 102 may be sent to the camera 2 and provided to the image sensor selector 16.

The image sensor selector 16 receives the panning/tilting direction and adjust the coordinates of UVx, UVy according to the direction and a predetermined or indicated distance. The UVx,UVy coordinate is then used by the image sensor selector 16 to generate the select signal 28 controlling the multiplexer 15.

The pixel transfers from the image sensors 10a-d are synchronized and, thus, the pixel of the coordinate x,y from each image sensor is present at the inputs of the multiplexer 15 at the same time, wherein x correspond to the pixel column of the image sensor and y correspond to the pixel line of the image sensor. Further, in FIG. 3 it is shown that the initial pixel from each image sensor 10a-d is transferred simultaneously at the time $t_0$, which is a result of the image sensors being synchronized. Accordingly, during each pixel clock cycle the select signal 28 from the image sensor selector 16 determines which one of the four pixels, each from different image sensors, the multiplexer is to pass on to the output of the multiplexer.

In the embodiment depicted in FIG. 2 the pixels from each image sensor are rasterized, i.e. delivered in a succession of ordered rows or columns. In the embodiment shown the pixels are rasterized as successive rows of the corresponding image with the pixels in each row from each image sensor 10a-d output pixel by pixel starting with the top left pixel followed by the next pixel in the same row and when the last pixel of a row is outputted then outputting the leftmost pixel of next row, etc. In this embodiment of the invention the image information required to form the target/user view 102, is transferred to the DSP in essentially one transfer cycle of the image sensors. Consistent with this requirement, the multiplexer 15 forwards image data from view D during the first five pixel transfers, i.e. the transfer of pixels 1,1 - 5,1 of view D. Pixels having the corresponding positions within the other views/image sensors A, B and C, may be discarded since they do not fall within the user view 102. During the pixel transfer of the rest of the pixels of this first line the multiplexer 15 has to forward image data from view C, i.e. the pixels 6,1 - 8,1 of view C, thus discarding the pixels having the corresponding positions within the other views/image sensors A, B and C. The same selection of pixel origin is made for line 2-4, i.e. the first five pixels from view D are forwarded and the rest of the pixels of each line are forwarded from view C. When the timing generator 18 indicates pixel transfer of pixels from line five the multiplexer 15 has to forward pixels from view B and view A. The first five pixels of line five is forwarded from view B and the rest is forwarded from view A. The same selection of pixel origin is made for line six. Accordingly, all the pixels of the user view 102 is transferred in one transfer cycle of an image sensor 10a-d, independent of how many of or which image sensors 10a-d are contributing image information to the resulting image of the target/user view. This is achieved by means of multiplexing through the multiplexer 15 only those pixels required to form the target view and discarding pixels of corresponding position within the rasterized pixel streams provided by the other image sensors.

In FIG. 2, the views provided by the image sensors are contiguous with one another. In alternate embodiments of the invention the views provided by the individual image sensors may be displaced from one another or may partially overlap one another without departing from the scope of the claimed invention.

Figure 3:
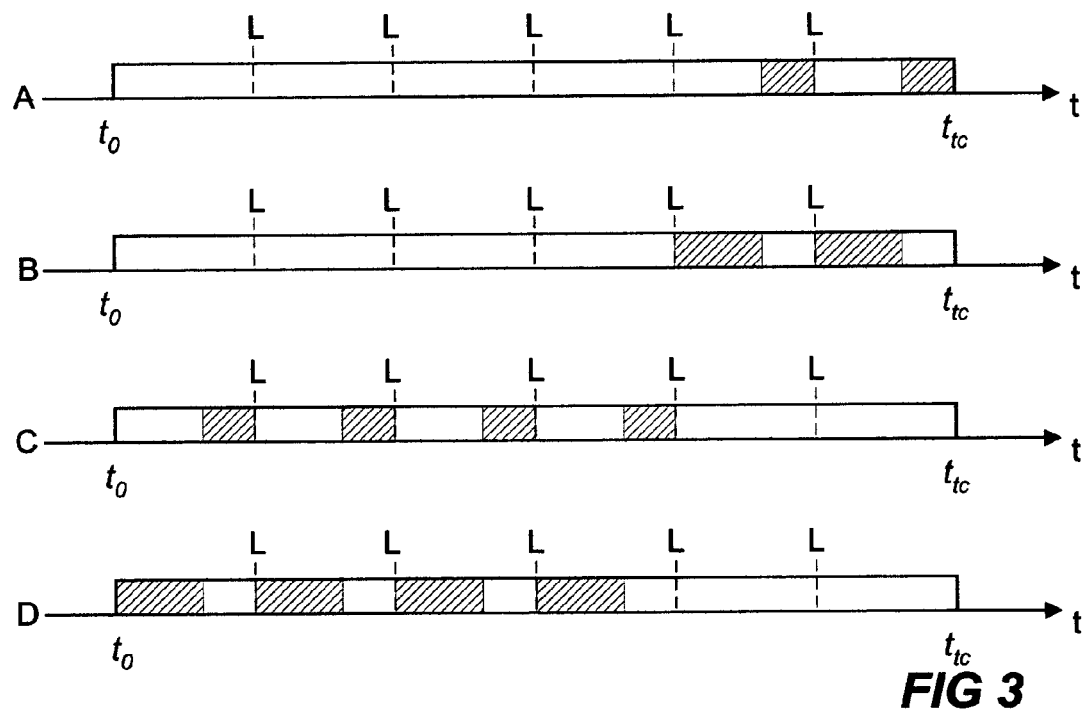

In FIG. 3, the pixel transfer for one transfer cycle, $t_0$-$t_{tc}$ from each image sensor 10a-d to the multiplexer 15 is shown. The box extending from $t_0$ to $t_{tc}$ represent all pixels transferred from an image sensor 10a-d during one transfer cycle. The dashed lines L represent the boundary between pixels from different lines. The first pixel transferred during a transfer cycle from the image sensor transferred at time $t_0$ and the last pixel transferred at time $t_{tc}$. Each transfer signal in FIG. 3 show image data transferred from each image sensor 10a-b, i.e. from each view A-D, wherein signal A shows the transfer from image sensor 10a, view A, signal B shows the transfer from image sensor 10b, view B, signal C shows the transfer from image sensor 10c, view C, and signal D shows the transfer from image sensor 10d, view D. In the FIG. 3 the data that are to be forwarded by the multiplexer 15 in accordance with the example above, i.e. the first five pixels from view D, then the next three pixels from view C, etc., is shown as hatched areas of the image data in the figures. Accordingly, at time $t_0$ a pixel from each of the image sensors is transferred from each of the image sensors 10a-d, though only a pixel from one of the image sensors is passed through the multiplexer, at t0 the pixel from sensor 10d is passed through.

Figure 4A:
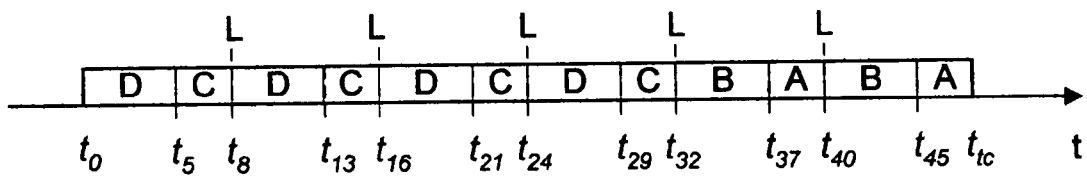
FIG. 4a is a schematic diagram of the transfer of pixels from the multiplexer to the DSP in the camera in FIG. 1, when a user view is positioned as showed in FIG. 2.

As mentioned above, the pixel transfers from the image sensors 10a-d are synchronised in this example and, thus, the image data forwarded from the multiplexer 15, showed in FIG. 4a, is of the same size as the image data transferred from any one of the image sensors 10a-d. Accordingly the process of transferring all pixels from the image sensors, rejecting the pixels not required to form the user/target view and accepting those pixels representing the user view 102 by means of the multiplexer 15, and transferring only the pixels representing the user view 102 to the DSP during a time period corresponding essentially to the time period of a image transfer cycle of any one of the image sensors 10a-d becomes possible, although some minor delays of the signals along the signal path may be experienced.

Figure 4B:
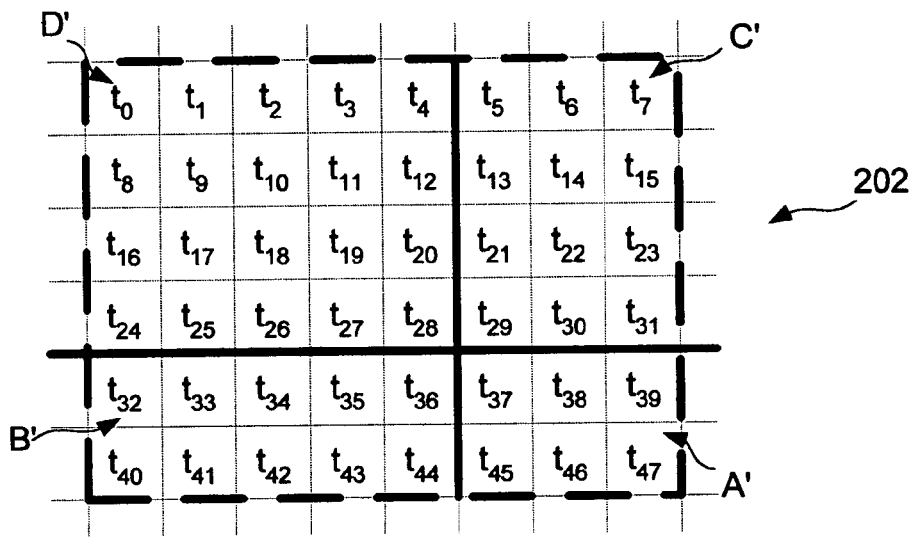
FIG. 4b is a schematic diagram of an intermediate image frame corresponding to the pixel stream in FIG. 4a, FIG. 4c is a schematic diagram of a resulting image frame or resulting view wherein the pixels have been rearranged in order to display a continuous image.

In FIG. 4a the origin of the image data transferred from the multiplexer 15 to the DSP 20, in accordance with the example above, is marked by naming the view that the data in each box originates from. Further, the time references, $t_x$, in the figure indicates the number of pixel cycles that have passed from the start of the transfer of the image, wherein x is equal to said number of pixel cycles. The start of the pixel transfer and the pixel clock of the image sensors 10a-d in this embodiment are synchronised and, thus, the first pixels transferred from the image sensors have the same position within the image sensor, in this specific example the pixel transfer begins the transfer with the top left pixel of each image sensor and then proceed during the next pixel clock cycle with the next pixel in the same row, etc. For image sensors registering color images the image sensors preferably are provided with identical optical filter patterns. The use of the invention may in such case result in a pixel stream which, if directly inserted into an image frame 202 in the same manner as the pixels are transferred from the each of the image sensors and if the above user view position is selected, is represented by an image where the contribution D' from image sensor 10d, i.e. from view D, is positioned in the upper left corner of such an image, the contribution C' from image sensor 10c, i.e. from view C, is positioned in the upper right corner, the contribution B' from image sensor 10b, i.e. from view B, is positioned in the lower left corner, and the contribution A' from image sensor 10A, i.e. from view A, is positioned in the lower right corner. This is evident when studying FIG. 4b in view of the resulting pixel stream in FIG. 4a. FIG. 4b show the pixels inserted in an image frame of the same size as the user view in the order they arrive at the DSP, which is indicated by the references to the time periods of FIG. 4a. This pixel stream may, thus, be seen as an intermediate image frame 202.

Figure 4C:
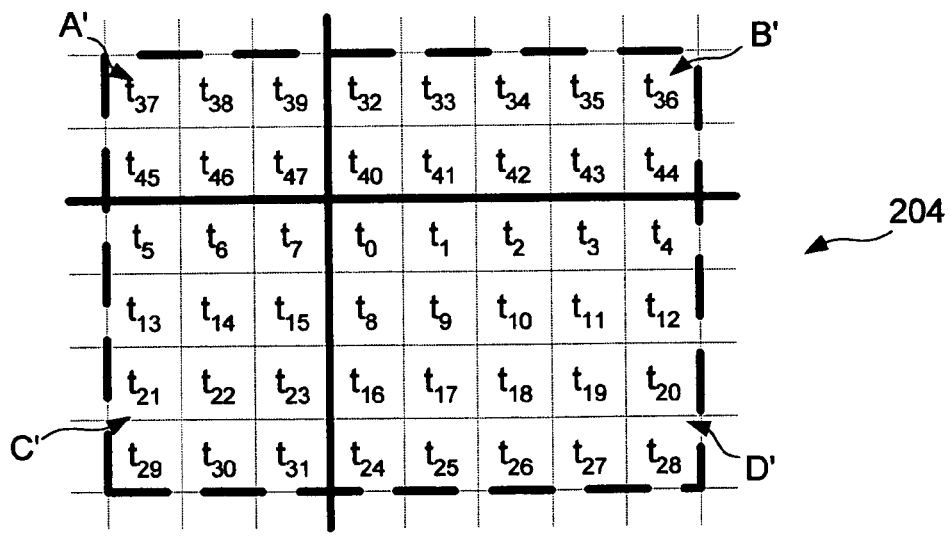

The intermediate image frame shown in FIG. 4b represents one frame of a target or user view with the pixels ordered as delivered by the multiplexer to the image processor without further processing. As is evident a resultant image at this stage of the image processing pipeline requires rearrangement before presentment to a user as a resulting image forming the target/user view 204, see FIG. 4c. The rearrangement of the intermediate image frame may be performed by software in the application means 24 in the camera 2, by hardware in the camera 2, by software in a client computer displaced from the camera and receiving the output thereof without rearrangement, or by hardware in such a client computer. In FIG. 4c the resulting view 204, representing the user view 102, is presented by referring to the pixel clock cycle periods corresponding to the periods shown in FIGS. 4a and 4b, from which each pixel originates.

Figure 5A:
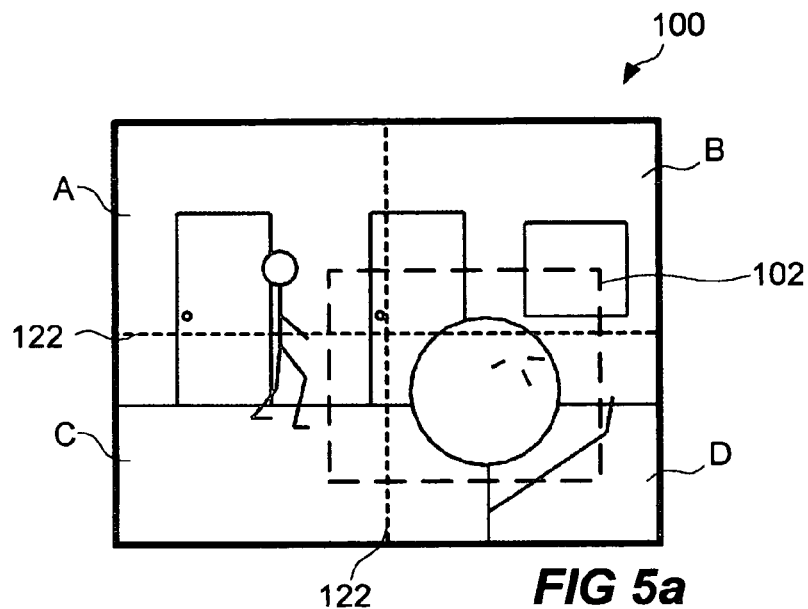
FIG. 5a shows an example of a possible way to arrange the image views for monitoring a specific area and a possible selected user view within the composition of image views.
Figure 5B:
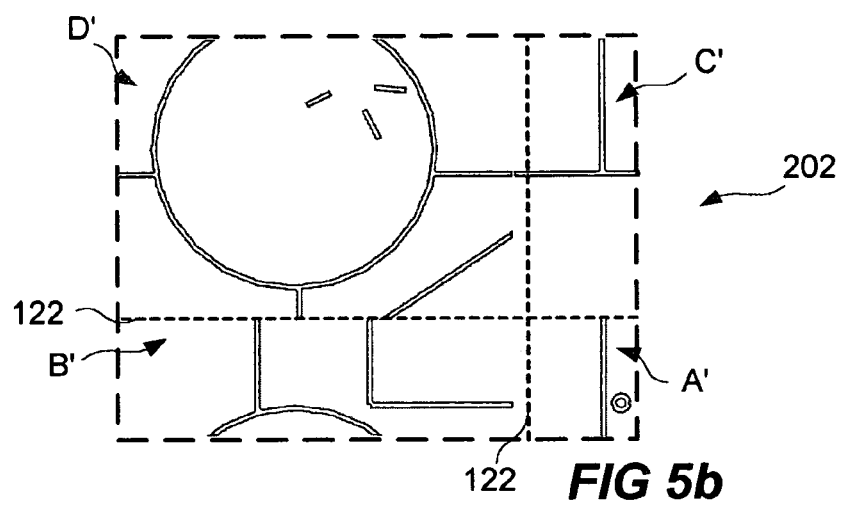
FIG. 5b shows a schematic diagram of an intermediate image frame resulting from the image views and the selected user view of FIG. 5a, FIG. 5c shows a schematic diagram of a resulting view provided by rearranging the intermediate view of FIG. 5b, and FIGS. 6a-c are schematic views depicting some possible view arrangements according to the invention.
Figure 5C:
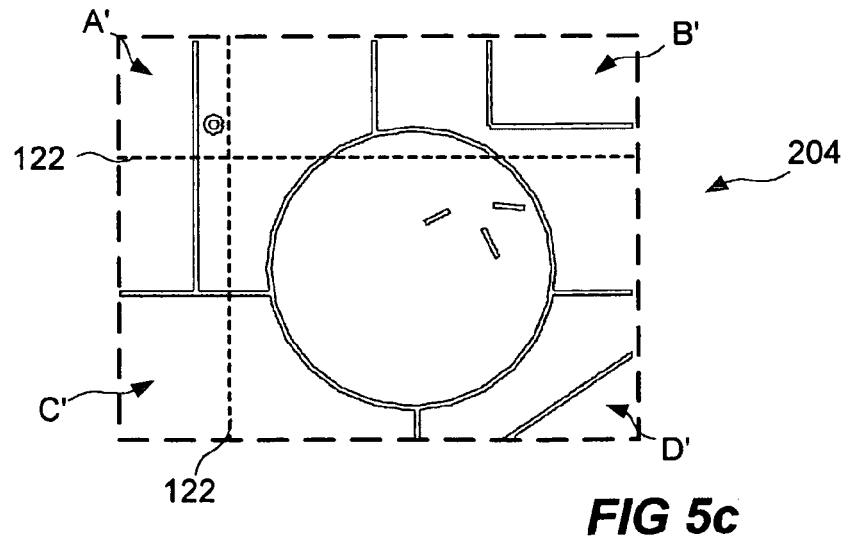

In FIG. 5a-c the above mentioned effects are exemplified. FIG. 5a shows a combined view of a monitored area 100 covered by four image sensors each registering view A, view B, view C, and view D, respectively. The boundary between different views are showed as dashed lines 122. It is at these boundaries, visualised by the dashed line 122 that the overlap of adjacent views, as mentioned above, may be present. The combined view of monitored area 100 is never assembled into an existing image. The present user view 102 is marked by a dashed line. The intermediate image frame 202 represented by the pixels and the sequential order of the pixels in the pixel stream forwarded from the multiplexer is showed in FIG. 5b. This figure corresponds to FIG. 4b. As clearly indicated in the figure the contribution D' from view D is positioned in the upper left corner, the contribution C' from view C is positioned in the upper right corner, the contribution B' from view B is positioned in the lower left corner, the contribution A' from view A is positioned in the lower right corner.

In FIG. 5c the intermediate image has been rearranged, as mentioned in connection with FIG. 4c, resulting in the resulting image or resulting view 204. In order to make the multiplexer 15 forward the image data of the user view 102 to the DSP 20 in accordance with the above mentioned example, the select signal 28 may be implemented as follows. In the following UVx and UVy represent the x coordinate and y coordinate, respectively, of the desired upper left pixel 104 of the user view 102 in the translatable frame of reference and tx and ty represent the coordinate of the pixel transferred to the multiplexer 15 from each of the image sensors 10a-d. Then the select signal 28 may be arranged to order the multiplexer 15 to forward the pixel at the input from:

image sensor 10a, view A, if tx$\geq$UVx AND if ty$\geq$UVy, image sensor 10b, view B, if tx<UVx AND if ty$\geq$UVy, image sensor 10c, view C, if tx$\geq$UVx AND if ty<UVy, and image sensor 10d, view D, if tx<UVx AND if ty<UVy.

The above implementation may be implemented in hardware, firmware, or software executed by the image sensor selector.

Accordingly, a user may control the position of the user view 102 within the total view 100, by means of an application or some control means, and receive an image or sequence of images comprising a portion of the image data of the total view 100 corresponding to the user view 102. The moving of the user view 102 then correspond to physical pan tilt movement of a camera having one image sensor of the size of the user view. Thus, the digital camera according to the invention is able to provide virtual pan/tilt functionality.

It may be difficult to achieve a perfect alignment of the views forming the total view 100, i.e. some image information from different image sensors may represent the same components. In such cases it may be appropriate to have an application process the image information from the DSP 20 in order to stitch portions from different image sensors 10a-b and provide one single continuous image, such programs generally are called image stitching programs.

According to one embodiment the camera may be arranged to enable a plurality of users receiving video images of different pan/tilt. In this embodiment of the invention the image sensor selector outputs a select signal to the multiplexer which effects a time-division multiplexing the pan/tilt instructions of multiple users. This may be accomplished by driving the multiplexer to produce an image frame consistent with each successive users requirements on successive frame cycles of the image sensors. A first frame of target image data consistent with a first users pan/tilt requirements is multiplexed from the image data provided by the image sensors during a first frame cycle/interval. This target image data is delivered to the image processor which in turn displays or delivers it to the first user. Then during the next frame cycle the target image data consistent with the second users pan/tilt requirements is multiplexed from the image data provided by the image sensors during the second frame cycle/interval. This target image data is delivered to the image processor which in turn displays or delivers it to the second user. This may then continue for a third, a fourth, etc. user. When all users have received their images the camera may start all over again with user one. Accordingly, each of the users receives an image stream of the views they have selected. The number of simultaneous users having different pan/tilt that is possible depends on the frame rate that the camera is able to produce and the frame rate the users are willing to accept.

Further, according to one embodiment, the size of the user view 102 may be different from the size of each image sensor. Provided that this is the case the image sensor selector 16 has to have access to a value representing the desired with and has to consider this value when generating the select signal 28.

Figure 6A:
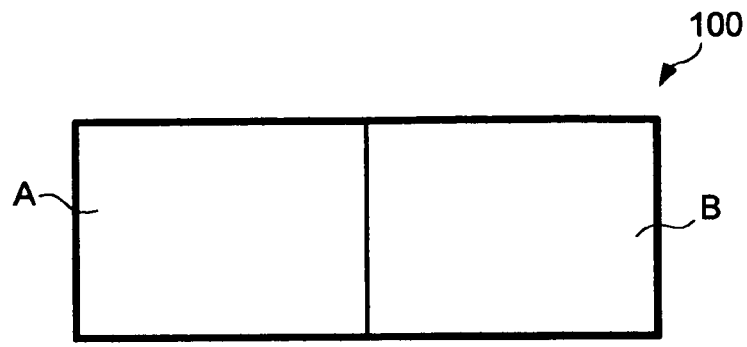
Figure 6B:
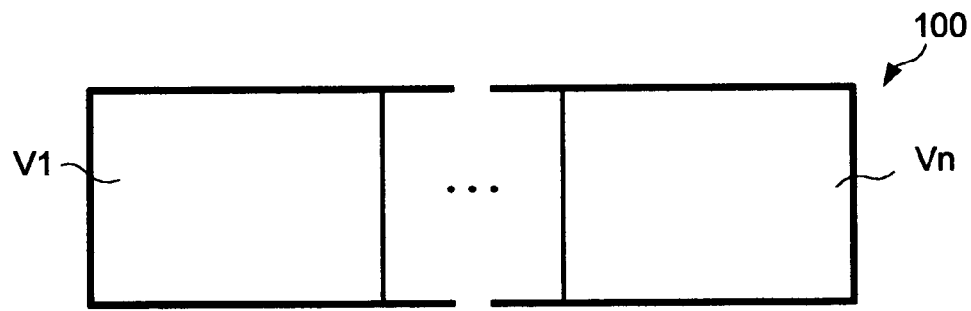
Figure 6C:
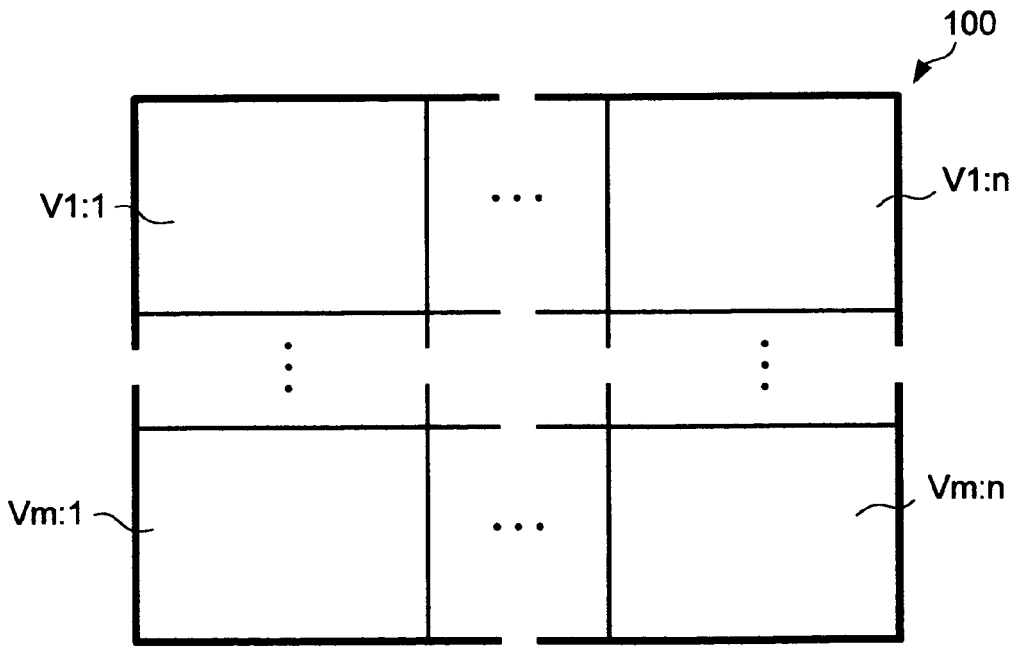

The invention is not limited to the arrangement of views as described in the embodiments and the example above. The camera may include two or more image sensors in order to capture images of a plurality of views. In FIGS. 6a-c a couple of examples of image view arrangements are showed. In FIG. 6a an embodiment having a total view 100 including two views A and B, i.e. two image sensors, that are horizontally aligned is showed. If the user view is essentially of the same size as one of the views A and B, then there is no space for tilting but only for panning. However, if the user view is smaller than one of the views A and B both pan and tilt functionality is available. The views A and B may also be vertically aligned.

In FIG. 6b, an embodiment having a total view 100 including n views V1-Vn, wherein n may be any number, which are horizontally aligned. This embodiment may include n image sensors. As in the embodiment in FIG. 6a, this embodiment only allow panning if the user view have essentially the same size as one of the views V1-Vn. The views of the embodiment in FIG. 6b may also be vertically aligned.

In FIG. 6c, an embodiment having a total view 100 including n columns of views and m lines of views V1:1-Vn:m is shown, wherein n and m may be any number. This embodiment may include n·m image sensors. This embodiment may be used to make it possible to achieve large pan/tilt movements.

It is also possible to arrange the lenses and the image sensors so that each image sensor capture image information from views that are not adjacent to each other, i.e. unrelated image views. For example, a first view may be arranged to cover a doorway from a first room, a second view may be arranged to cover a doorway from a second room, a third view may be arranged to cover a window, and a fourth view may be arranged to cover an opening in the floor. The views may be at such distance from each other that it is not possible to cover them with relevant views being positioned adjacent to each other. In a case like this the panning and tilting results in a sliding transition between unrelated views. For example, if a user studies the first doorway and pan horizontally the user may scroll out the first doorway while the view of the second doorway come into view. Accordingly, the user may see a portion of each view simultaneously and may experience a boundary between the two views, because the image information of the objects between the two doors is not captured by the digital camera, during the panning.

According to another aspect of the invention, the image sensors may be controlled by means of timing signals that are not synchronous. By controlling the transfer from each image sensor individually and by considering both the timing of each image sensor and the selection of image sensor output it is possible to make the user view larger than one image sensor.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for capturing images from a monitored area, and the apparatus comprising:
    image sensors each providing a rasterized pixel stream corresponding to a succession of images from a corresponding substantially discrete view within the monitored area;
    an image sensor selector for defining a target view within the monitored area in terms of selected portions of the substantially discrete views from each of the image sensors, a selected portion of the substantially discrete views being a subset of the pixels from an image sensor, and for generating a select signal for selecting individual pixels from each of the rasterized pixel streams which fall within the target view; and
    a pixel selector with inputs, an output, and a control input, and the inputs each coupled to a corresponding one of the image sensors to receive corresponding rasterized pixel streams there from, and the pixel selector responsive to the select signal from the image sensor selector at the control input to select from each set of rasterized pixel streams from the image sensors exclusively those pixels located within the target view and to avoid selection of all pixels not within the target view and to output a rasterized stream of selected pixels corresponding exclusively with the target view, thereby limiting subsequent image processing to those pixels falling within the target view and avoiding processing of unselected pixels determined by the image sensor selector which fall within the monitored area but outside the target view.

2. The apparatus of claim 1, further comprising:
    an image processor with an input coupled to the output of the pixel selector for processing the rasterized stream of selected pixels there from including rearranging the pixels to conform with an associated location in the target view.

3. The apparatus of claim 1, wherein the image sensor selector includes responsiveness to a pan and/or tilt signal to vary a location of the target view within the monitored area.

4. The apparatus of claim 1, wherein the views of each of the image sensors correspond with at least one of: contiguous portions of a monitored area, separate portions of the monitored area and partially overlapping portions of the monitored area.

5. The apparatus of claim 1, wherein the views provided by each of the image sensors corresponds with substantially discrete fixed portions of a monitored area.

6. The apparatus of claim 1, further comprising:
    a timing generator synchronizing the delivery of each pixel of the rasterized pixel streams from each of the image sensors to the image sensor selector.

7. The apparatus of claim 1, wherein the image sensor selector includes responsiveness to multiple pan and/or tilt signal inputs from multiple users to output the select signal to the pixel selector which effects a time-division multiplexing of the pan/tilt instructions of the multiple users.

8. A method for capturing images from a monitored area, and the method comprising:
    delivering at least two rasterized pixel streams each corresponding to a succession of images obtained from a corresponding substantially discrete view within the monitored area;
    defining a target view within the monitored area in terms of selected portions of the substantially discrete views provided in the delivering act; a selected portion of the substantially discrete views being a subset of the pixels from an image sensor;

generating a select signal for selecting individual pixels from each of the rasterized pixel streams which fall within the target view; and selecting in response to the select signal generated in the generating act, from each of the rasterized pixel streams delivered in the delivering act, exclusively those pixels located within the target view, thereby avoiding processing of unselected pixels not within the target view and reducing subsequent image processing requirements.

9. The method of claim 8, further comprising:

rearranging each of the pixels selected in the selecting act to conform with an associated location of the respective pixel in the target view.

10. The method of claim 8, wherein the defining act further comprises:

re-defining the target view within the monitored area responsive to at least one of a pan instruction and a tilt instruction.

11. The method of claim 8, wherein the rasterized pixel streams delivered in the delivering act correspond with at least one of: contiguous portions of the monitored area, separate portions of the monitored area and partially overlapping portions of the monitored area.

12. The method of claim 8, wherein the rasterized pixel streams delivered in the delivering act correspond with substantially discrete fixed portions of the monitored area.

13. The method of claim 8, further comprising:

synchronizing the delivery of each pixel of the rasterized pixel streams delivered in the delivering act.

14. The method of claim 8, wherein the defining act further comprises:

iteratively re-defining the target view within the monitored area responsive to multiple pan or tilt instructions from a plurality of users.

* * * * *